US012686433B2

(12) United States Patent
Shin

(10) Patent No.: US 12,686,433 B2
(45) Date of Patent: Jul. 21, 2026

(54) STEERING APPARATUS

(71) Applicant: HL MANDO CORPORATION,
Gyeonggi-do (KR)

(72) Inventor: Kyungsub Shin, Gyeonggi-do (KR)

(73) Assignee: HL MANDO CORPORATION,
Gyeonggi-do (KR)

( * ) Notice: Subject to any disclaimer, the term of this
patent is extended or adjusted under 35
U.S.C. 154(b) by 536 days.

(21) Appl. No.: 18/121,732

(22) Filed: Mar. 15, 2023

(65) Prior Publication Data

US 2023/0294757 A1     Sep. 21, 2023

(30) Foreign Application Priority Data

Mar. 15, 2022    (KR) ........................ 10-2022-0032287

(51) Int. Cl.
*B62D 5/04*          (2006.01)
*B62D 15/02*        (2006.01)
*F16H 25/20*        (2006.01)

(52) U.S. Cl.
CPC ......... *B62D 5/0424* (2013.01); *B62D 5/0403*
(2013.01); *B62D 5/0469* (2013.01); *B62D*
*15/021* (2013.01); *F16H 25/2015* (2013.01)

(58) Field of Classification Search
CPC .. B62D 5/0403; B62D 5/0424; B62D 5/0469;
F16H 25/2015
See application file for complete search history.

(56) References Cited

U.S. PATENT DOCUMENTS 6,024,187 A *  2/2000  Takeda ................... G01C 21/28
                                                        701/31.2
2008/0223160 A1*  9/2008  Yamaguchi ............. F16H 25/20
                                                        74/89.23
(Continued)

FOREIGN PATENT DOCUMENTS

CN        114174148        3/2022
CN        112867660        5/2022
(Continued)

OTHER PUBLICATIONS

Office Action (1st) dated Jul. 30, 2025 for Chinese Patent Applica-
tion No. 202310241351.0 and its English translation provided by
Applicant's foreign counsel/Global Dossier.
(Continued)

*Primary Examiner* — William C Joyce
(74) *Attorney, Agent, or Firm* — WOMBLE BOND
DICKINSON (US) LLP

(57)                    ABSTRACT
A steering apparatus includes a housing in which a rod
slidably provided in an axial direction for wheel steering is
accommodated and a sensor coupler passing through an
inner surface and an outer surface to expose a part of the rod
is provided, a rotation preventer coupled to the rod through
the sensor coupler to be moved together with the rod and
supported in a width direction of the housing to limit rotation
of the rod, a damper coupled to the rotation preventer to be
disposed between the sensor coupler and the rotation pre-
venter, a magnet holder coupled to the rotation preventer to
be moved together with the rod and provided with a magnet,
and a sensing unit coupled to the sensor coupler and includ-
ing a sensor configured to sense a position of the magnet.

14 Claims, 12 Drawing Sheets

(56) References Cited

U.S. PATENT DOCUMENTS

| | | | | |
|---|---|---|---|---|
| 2014/0353066 A1* | 12/2014 | Sato | ..................... | B62D 5/0415 180/444 |
| 2018/0023608 A1* | 1/2018 | Matsushima | ......... | F16F 1/3732 411/37 |
| 2024/0255540 A1* | 8/2024 | Shirakawa | ......... | B62D 15/0225 |

FOREIGN PATENT DOCUMENTS

| | | | | |
|---|---|---|---|---|
| JP | 2018119937 A | * | 8/2018 | ............. G01D 5/145 |
| KR | 10-2037296 | | 10/2019 | |
| KR | 10-2020-0043829 | | 4/2020 | |
| KR | 10-2106287 | | 5/2020 | |
| KR | 10-2021-0012202 | | 2/2021 | |

OTHER PUBLICATIONS

Office Action (1st) dated Mar. 6, 2026 for Korean Patent Application No. 10-2022-0032287 and its English translation provided by Applicant's foreign counsel.

* cited by examiner

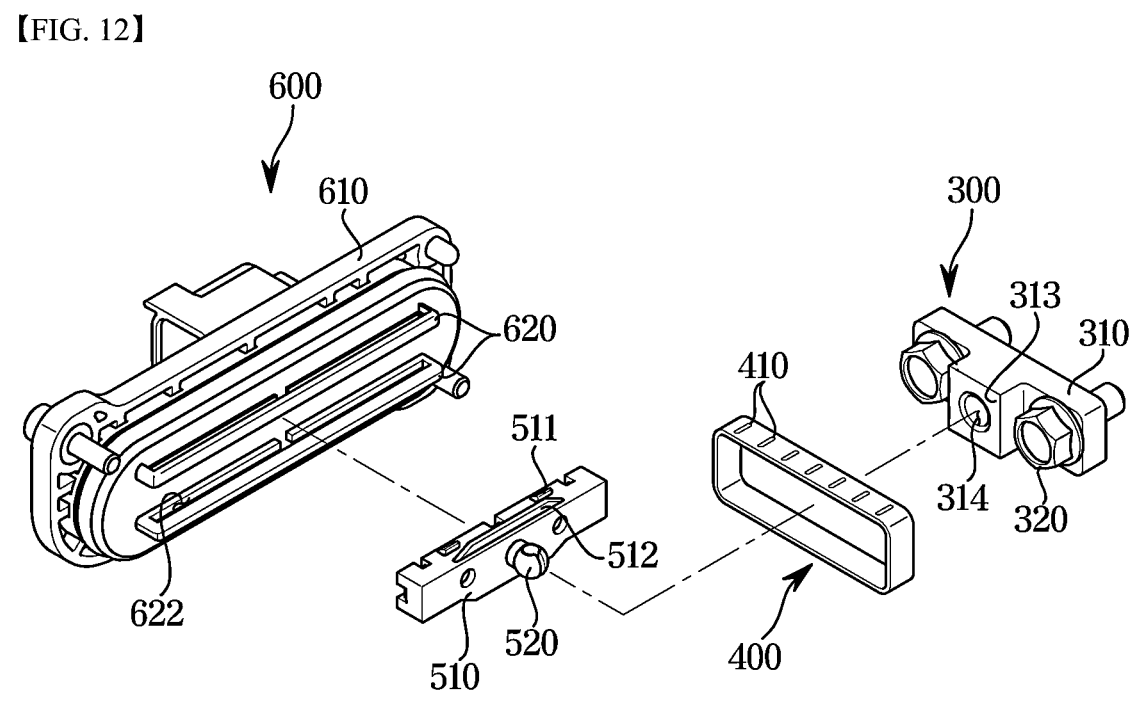

【FIG. 12】

STEERING APPARATUS

CROSS-REFERENCE TO RELATED APPLICATION

This application claims the benefit of Korean Patent Application No. 10-2022-0032287, filed on Mar. 15, 2022 in the Korean Intellectual Property Office, the disclosure of which is incorporated herein by reference.

BACKGROUND

1. Field

Embodiments of the present disclosure relate to a steering apparatus, and more particularly, to a steer-by-wire type steering apparatus in which a mechanical connection between a steering wheel and driving wheels of a vehicle is eliminated.

2. Description of the Related Art

In general, a steer-by-wire type steering apparatus is a kind of electric steering apparatus, and refers to an apparatus for steering a vehicle by using electrical power without mechanical connection between a steering wheel and the steering apparatus by, for example, a steering column, a universal joint, and the like.

The steer-by-wire type steering apparatus may steer either the front or rear wheels, or steer both the front and rear wheels. That is, the steer-by-wire type steering apparatus steers the front or rear wheels by axially sliding a sliding bar (hereinafter referred to as a "rod") connected to the front or rear wheels.

The rod is driven by a motor, and the rotation of the rod is prevented by an anti-rotation member coupled to the rod and supported by a housing because a pinion shaft is not provided in the steer-by-wire type steering apparatus. In this case, the anti-rotation member does not simply perform the function of limiting the rotation of the rod, and is also used to control the amount of displacement of the rod according to a steering angle according to operation of the steering wheel by a driver with a displacement measuring sensor for checking the position of the rod included therein.

However, it is likely that a gap between the anti-rotation member and the housing increases due to wear of the anti-rotation member occurring as the rod slides in a state in which its rotation is limited by the anti-rotation member. The increase in the gap may be the cause of a problem of noise and vibrations being generated due to the impact between the anti-rotation member and the housing. In addition, the increase in the gap may lead to the lowering of accuracy of a sensor for determining the position of the rod from the anti-rotation member.

SUMMARY

Therefore, it is an aspect of the present disclosure to provide a steering apparatus capable of minimizing noise and vibrations due to the impact between a rod and a housing as well as preventing the rotation of the rod.

It is another aspect of the present disclosure to provide a steering apparatus capable of preventing the deterioration of the accuracy of a sensor for sensing the position of a rod by compensating for a gap for stable support even when wear with the housing occurs.

In accordance with one aspect of the present disclosure, a steering apparatus includes a housing in which a rod slidably provided in an axial direction for wheel steering is accommodated and a sensor coupler passing through an inner surface and an outer surface to expose a part of the rod is provided, a rotation preventer coupled to the rod through the sensor coupler to be moved together with the rod and supported in a width direction of the housing to limit rotation of the rod, a damper coupled to the rotation preventer to be disposed between the sensor coupler and the rotation preventer, a magnet holder coupled to the rotation preventer to be moved together with the rod and provided with a magnet, and a sensing unit coupled to the sensor coupler and including a sensor configured to sense a position of the magnet.

The rotation preventer may include a support member having at least one coupling hole formed to be coupled to the rod, and a fixing bolt being inserted into the coupling hole to be coupled to the rod.

The rod may be provided with a chamfered portion so that the support member is seated in surface contact.

The support member may include a coupling portion with a center that protrudes upward, and may have the coupling holes formed on both sides in the axial direction.

A fastening groove coupled with the magnet holder may be formed in the coupling portion.

A bush may be provided in the coupling hole.

The damper may be coupled to an outer surface of the support member, and provided between the support member and the sensor coupler in a compressed state.

The damper may include a grease pocket for storing a fluid to lubricate a portion between the sensor coupler and the damper.

A plurality of grease pockets may be formed at regular intervals on an outer surface of the damper.

The sensor coupler may include an elongated hole formed to be long in the axial direction, and the elongated hole may be provided as a first elongated hole into which the rotation preventer is inserted, and a second elongated hole that is formed stepwise from the first elongated hole on an outer circumferential side of the first elongated hole and into which the sensing unit is partially inserted and coupled.

The magnet holder may include a main body, a magnet fixed to the main body, and a fastener protruding from a lower portion of the main body and coupled to the rotation preventer, and a fastening groove into which the fastener is inserted may be formed in the rotation preventer.

The fastener may have a spherical shape having a diameter larger than a diameter of the fastening groove, may be provided with a cut groove in a vertical direction at a center of the fastener, deformed by the cut groove, and press-fitted into the fastening groove.

The sensing unit may include a sensor housing coupled to close the sensor coupler, and a pair of guides spaced apart in the width direction and formed in the axial direction on a lower side of the sensor housing inserted into the sensor coupler, and the magnet holder may be supported and moved between the pair of guides.

In accordance with another aspect of the present disclosure, a steering apparatus includes a housing in which a rod slidably provided in an axial direction for wheel steering is accommodated and a sensor coupler passing through an inner surface and an outer surface to expose a part of the rod is provided, a rotation preventer coupled to the rod through the sensor coupler to be moved together with the rod and supported in a width direction of the housing to limit rotation of the rod, a damper coupled to the rotation preventer to be disposed between the sensor coupler and the rotation preventer, a magnet holder movably coupled to the rotation preventer to be moved together with the rod and provided with a magnet, and a sensing unit coupled to the sensor coupler and including a sensor configured to sense a position of the magnet.

The magnet holder may include a main body, a magnet fixed to the main body, and a spherical fastener inserted into a fastening groove provided in the rotation preventer, and the fastener may be rotatable by a predetermined angle with respect to a center of the fastener within the fastening groove and movable in a direction orthogonal to the axial direction of the rod within the fastening groove.

The magnet may be integrally provided with the main body by insert injection molding.

The sensing unit may include a sensor housing coupled to close the sensor coupler, and a pair of guides spaced apart in the width direction and formed in the axial direction on a lower side of the sensor housing inserted into the sensor coupler, and the magnet holder may include support portions that are each supported between the pair of guides on both sides in a width direction and may be moved between the pair of guides.

The guide may include a guide hole formed in a longitudinal direction, and the support portion may include a first support portion supported by being inserted into the guide hole, and a second support portion supported by the guide.

At least one of the first support portion and the second support portion may be divided in the longitudinal direction to be provided in a plurality.

The first support portion may be provided in a wedge shape with one side having an inclined surface.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 12 is an exploded perspective view showing a coupled state of a sensing unit and a magnet holder provided in the steering apparatus in accordance with one embodiment of the present disclosure.

DETAILED DESCRIPTION

Hereinafter, embodiments of the present disclosure will be described in detail with reference to the accompanying drawings. The following embodiments are provided to fully convey the spirit of the present disclosure to those skilled in the art to which the present disclosure pertains. The present disclosure is not limited to the embodiments shown herein and may be embodied in other forms. The drawings are not intended to limit the scope of the present disclosure in any way, and the size of components may be exaggerated for clarity of illustration.

Figure 1:
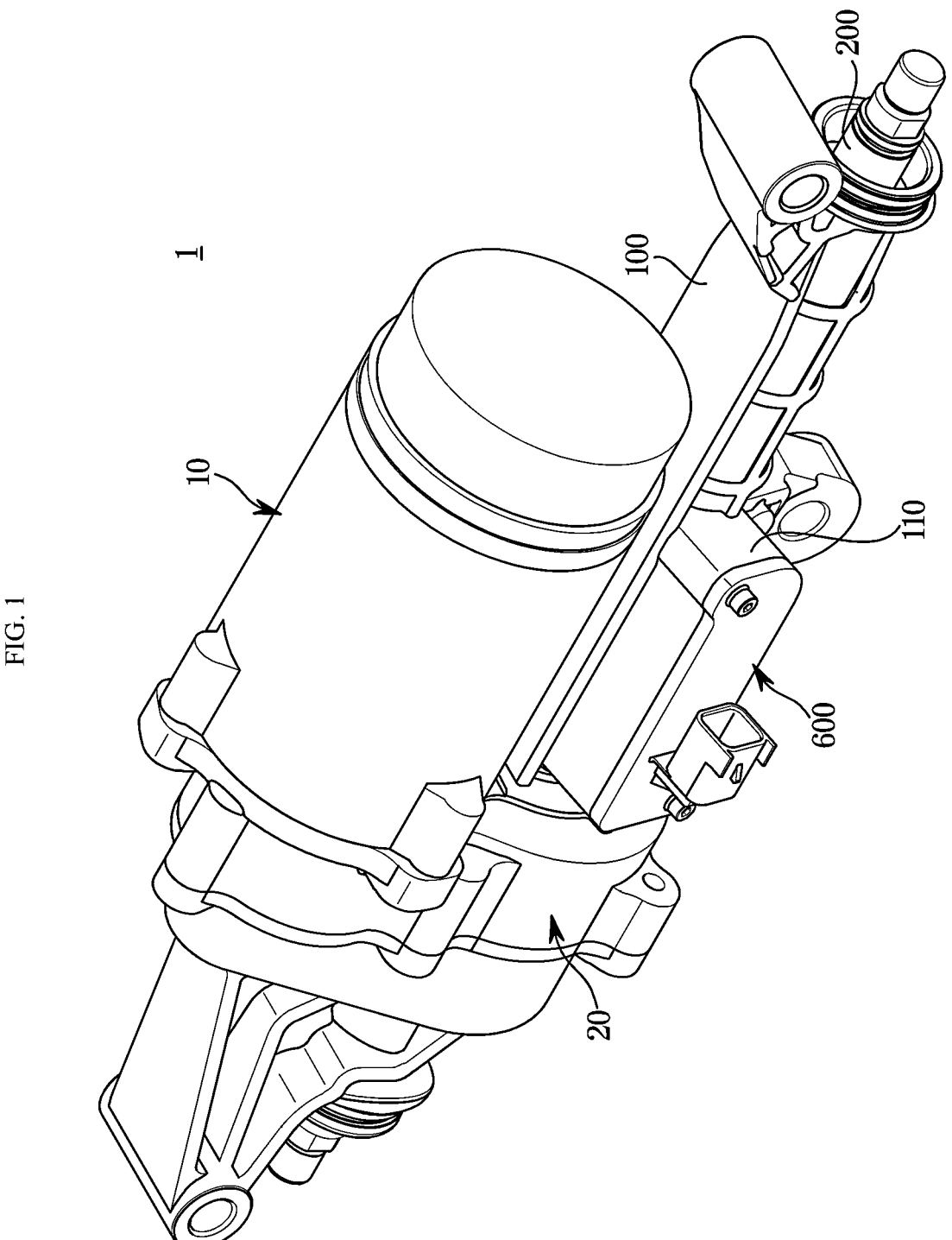
FIG. 1 is a perspective view showing a steering apparatus in accordance with one embodiment of the present disclosure.
Figure 2:
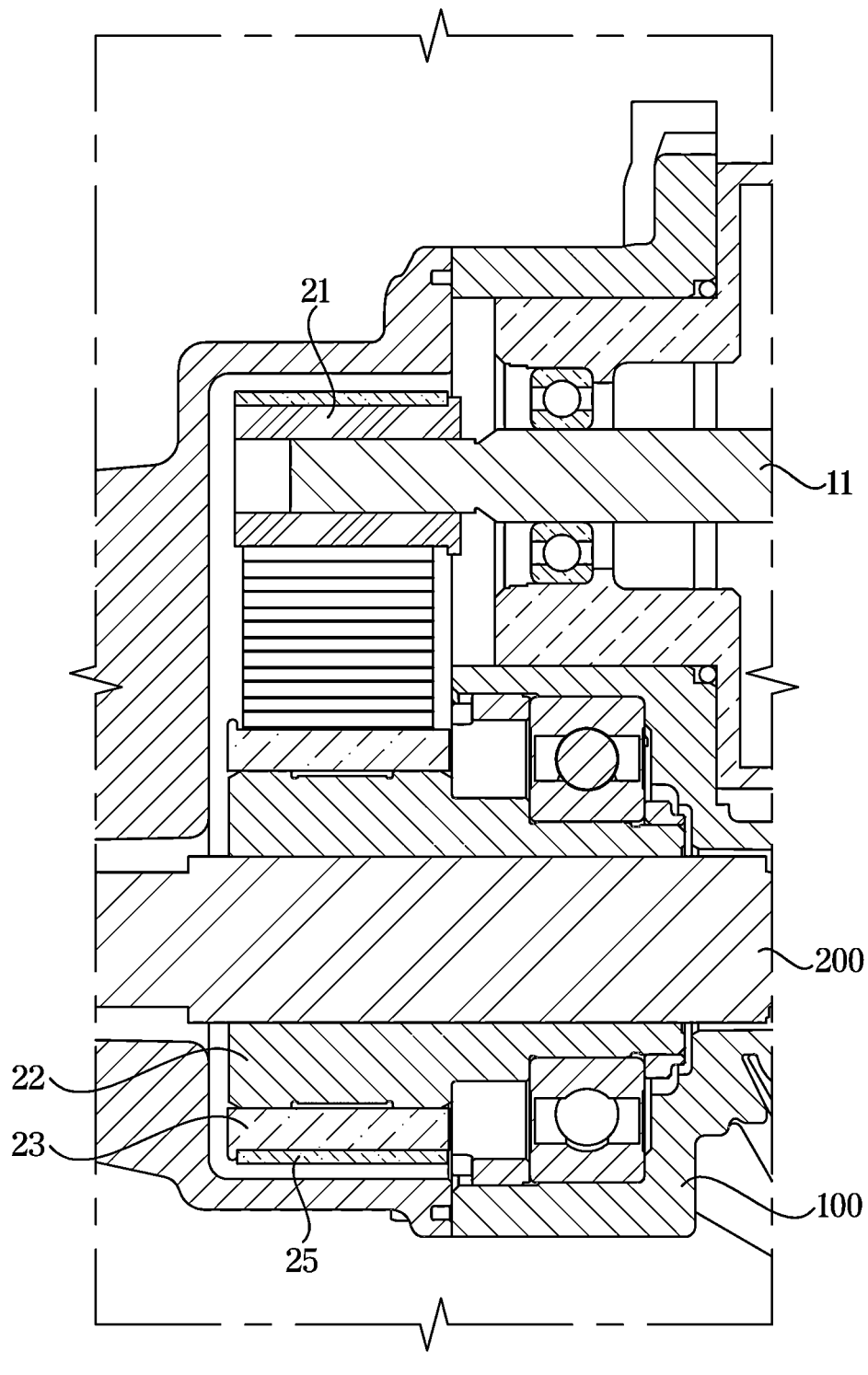
FIG. 2 is a schematic cross-sectional view showing a power transmission device of the steering apparatus in accordance with one embodiment of the present disclosure.
Figure 3:
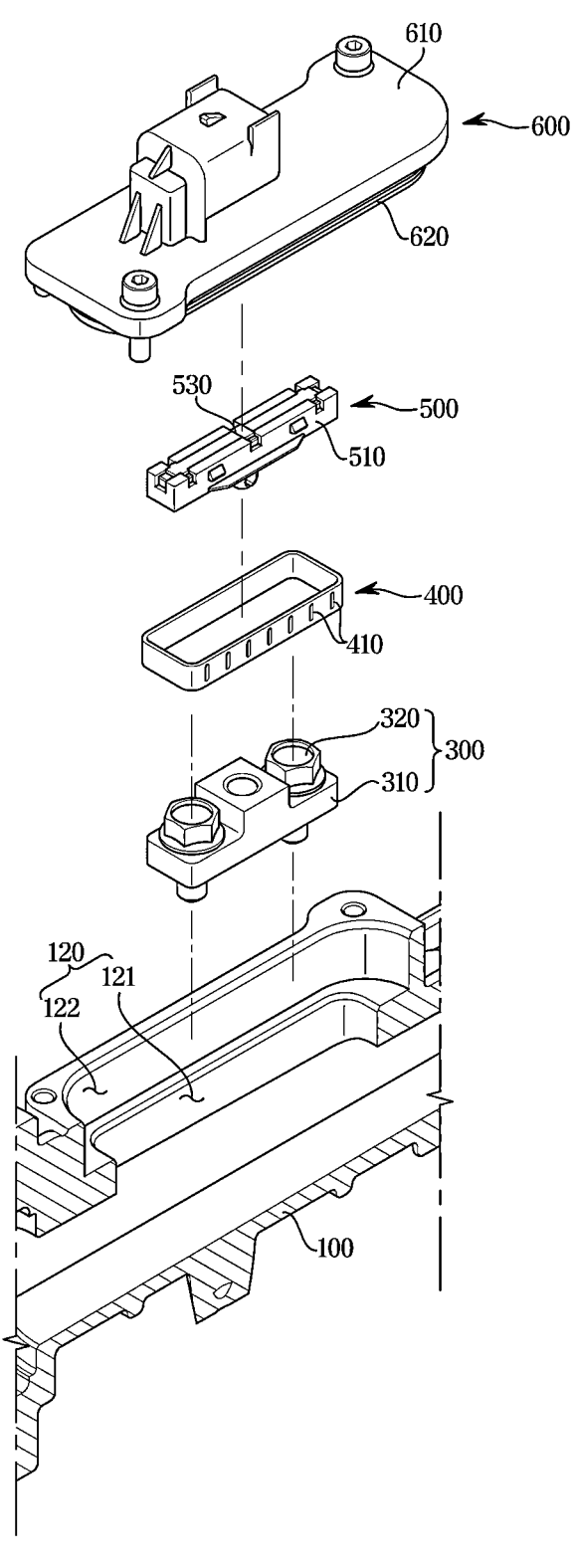
FIG. 3 is an exploded perspective view showing main parts of the steering apparatus in accordance with one embodiment of the present disclosure.
Figure 4:
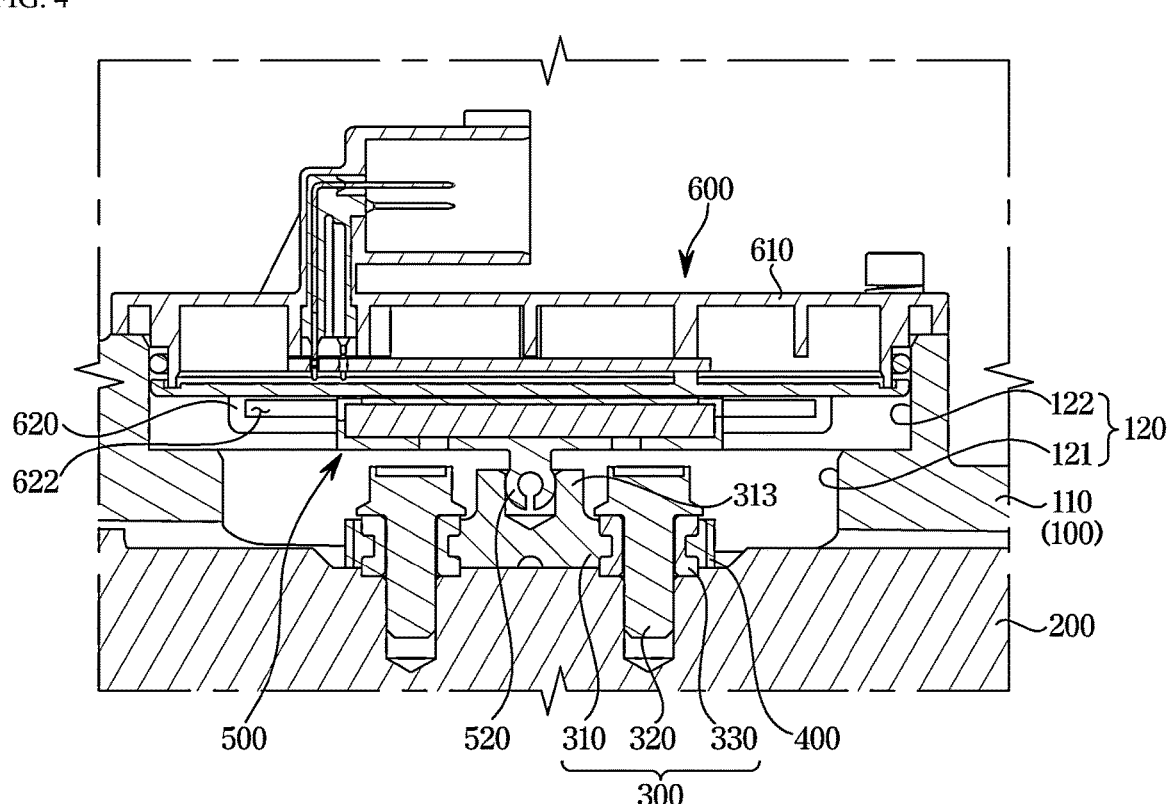
FIG. 4 is a cross-sectional view showing main parts of the steering apparatus in accordance with one embodiment of the present disclosure.
Figure 5:
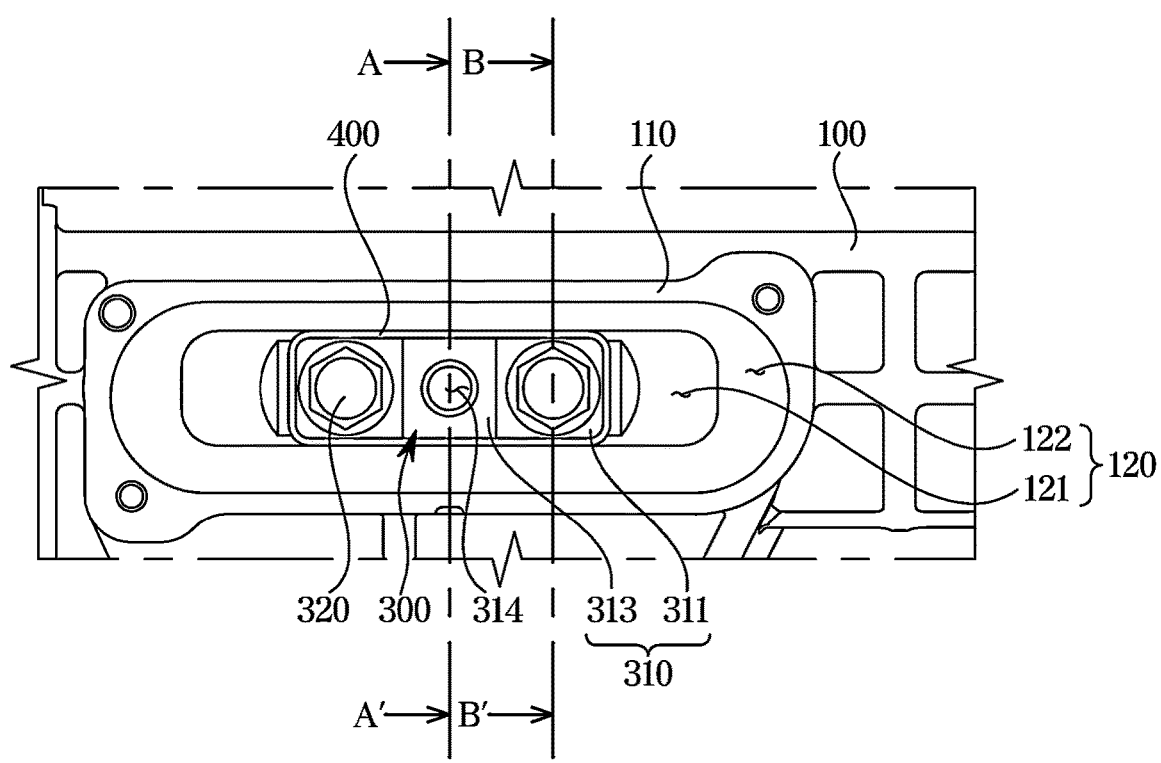
FIG. 5 is a plan view showing main parts of the steering apparatus in accordance with one embodiment of the present disclosure.
Figure 6:
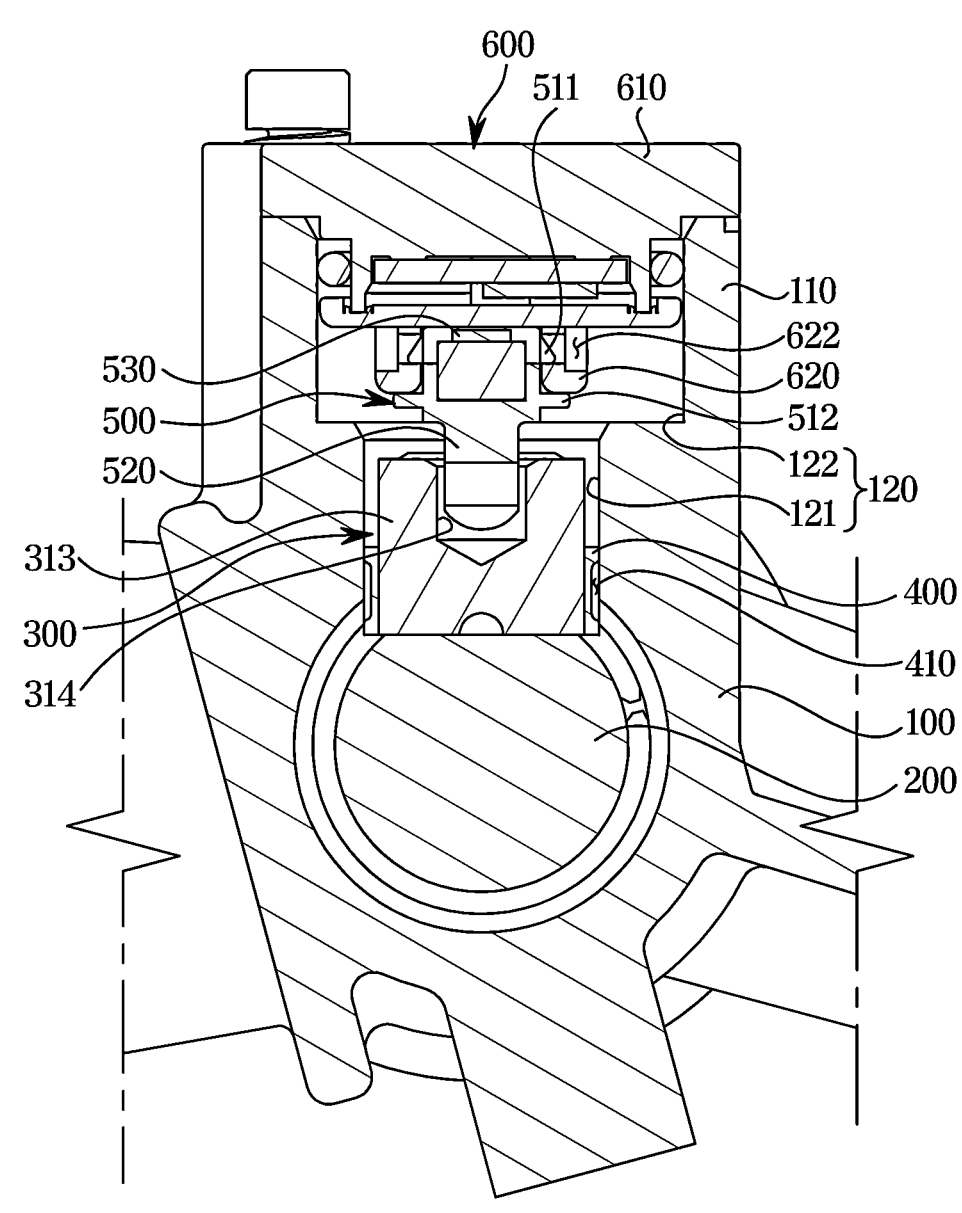
FIG. 6 is a cross-sectional view taken along line A-A' in FIG. 5.
Figure 7:
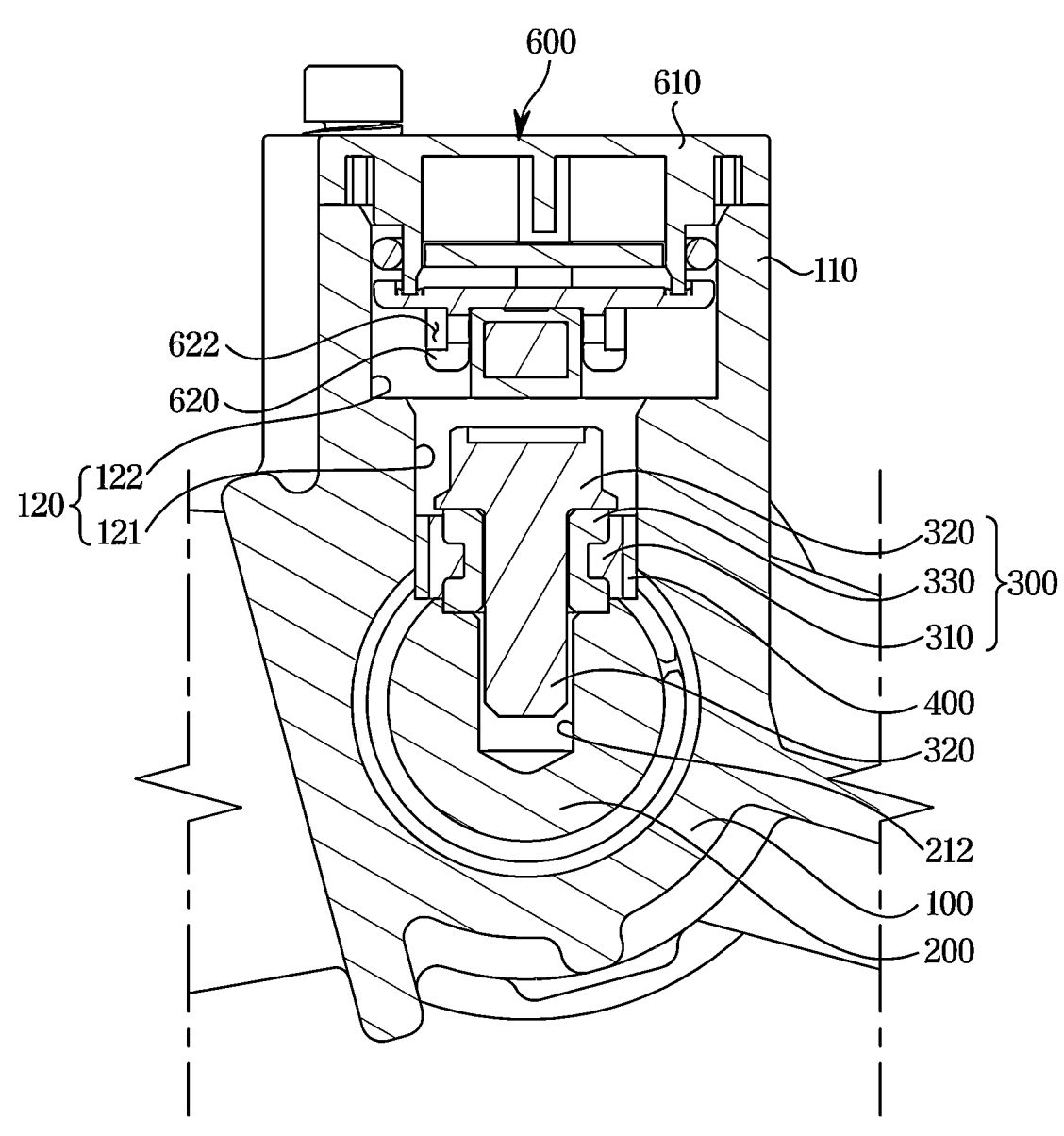
FIG. 7 is a cross-sectional view taken along line B-B' in FIG. 5.
Figure 8:
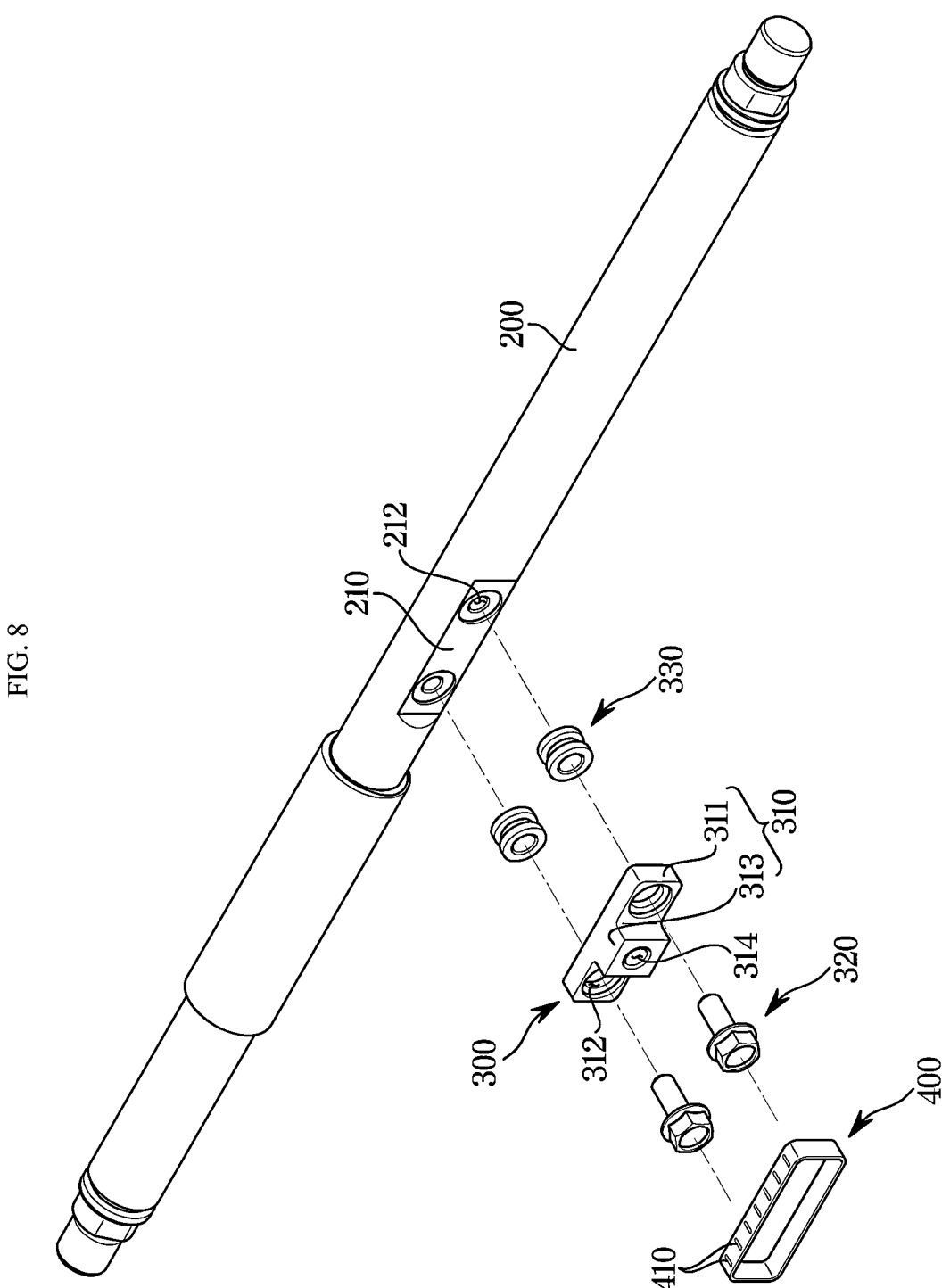
FIG. 8 is an exploded perspective view showing a state in which a rotation preventer and a damper are coupled to the rod provided in the steering apparatus in accordance with one embodiment of the present disclosure.
Figure 9:
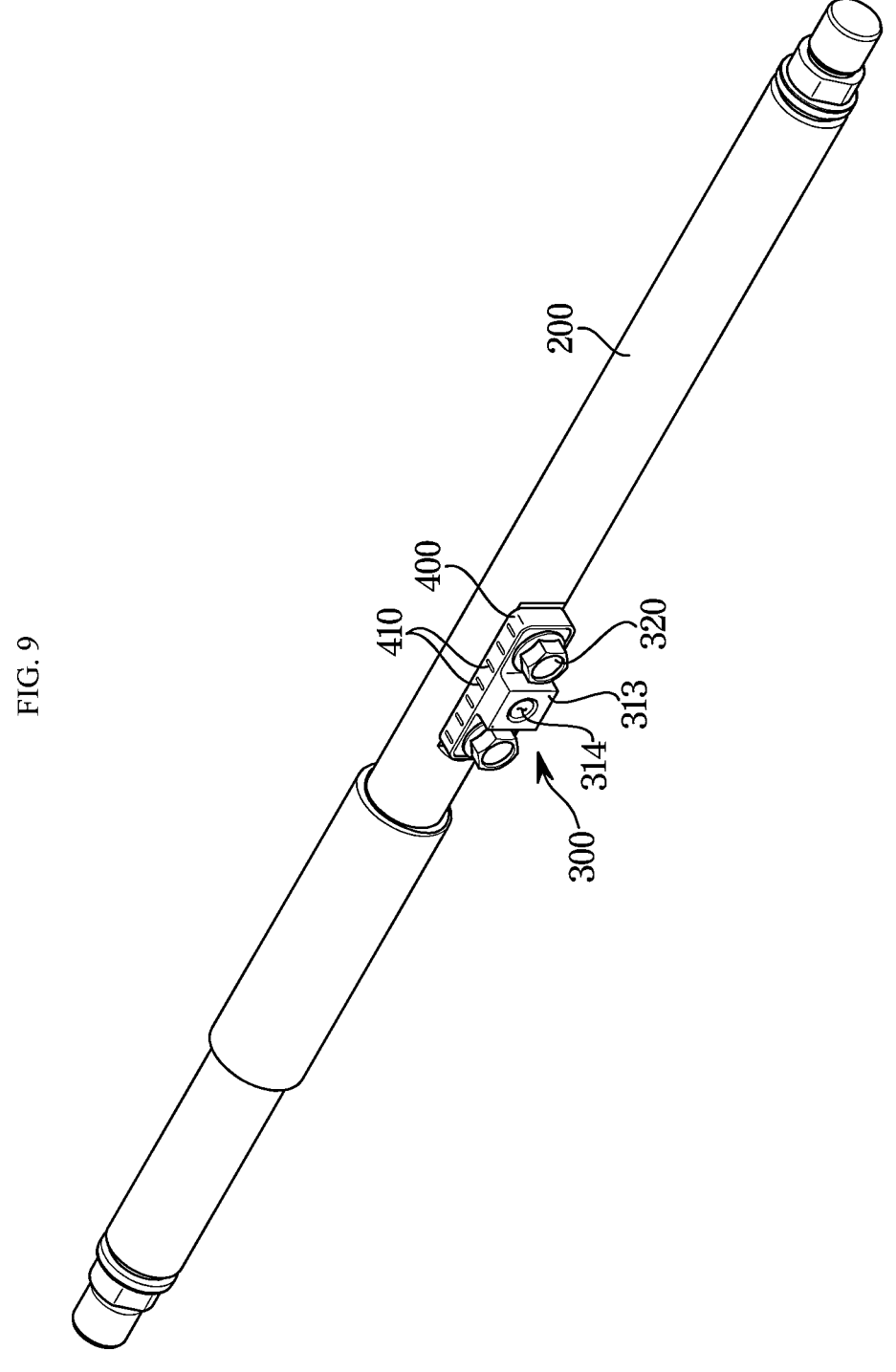
FIG. 9 is an assembled perspective view of FIG. 8.
Figure 10:
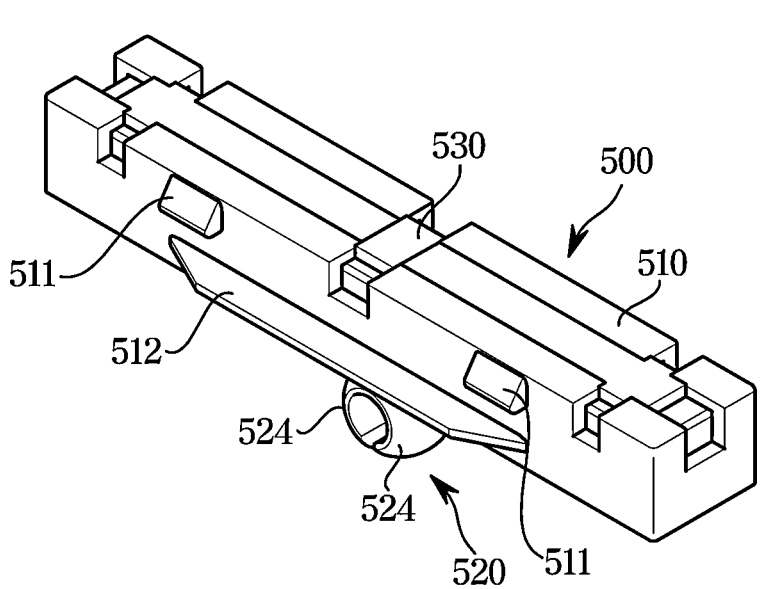
FIG. 10 is a perspective view showing a magnet holder provided in the steering apparatus in accordance with one embodiment of the present disclosure.
Figure 11:
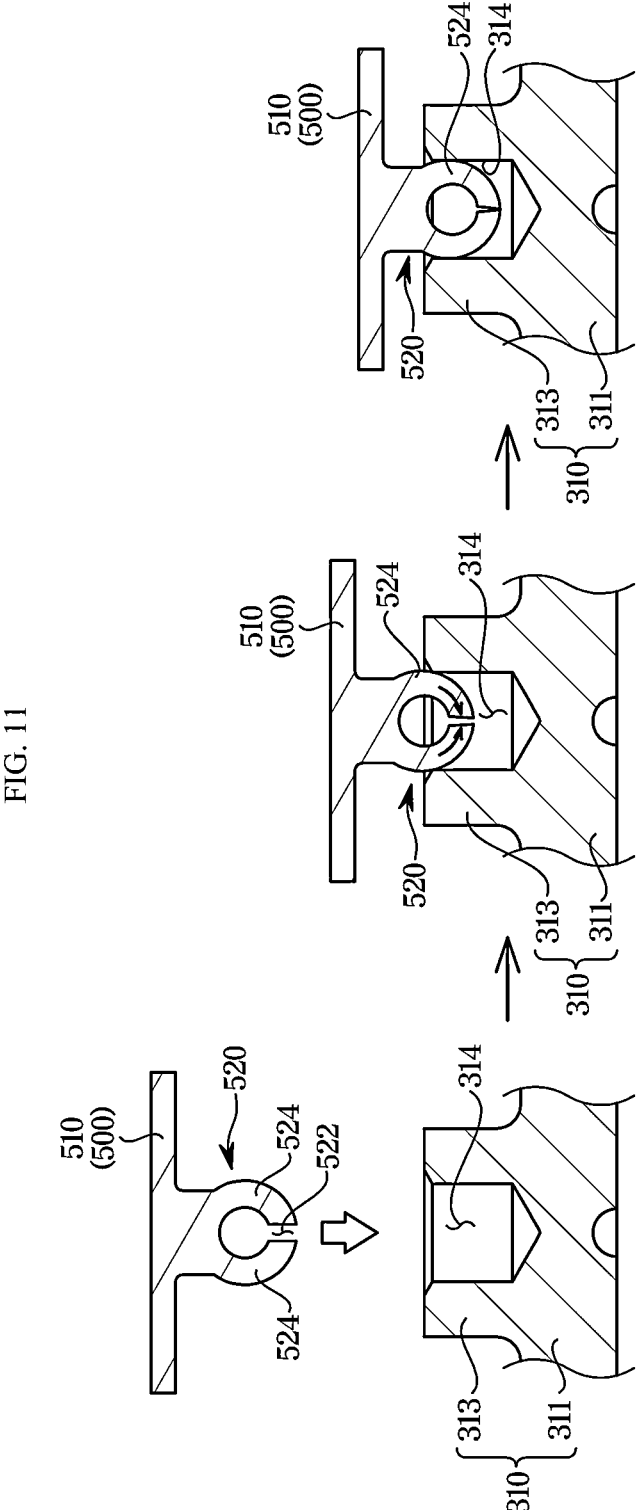
FIG. 11 is a view showing a process of coupling a rotation preventer and a magnet holder provided in the steering apparatus in accordance with one embodiment of the present disclosure.

FIG. 1 is a perspective view showing a steering apparatus in accordance with one embodiment of the present disclosure, FIG. 2 is a schematic cross-sectional view showing a power transmission device of the steering apparatus in accordance with one embodiment of the present disclosure, FIG. 3 is an exploded perspective view showing main parts of the steering apparatus in accordance with one embodiment of the present disclosure, FIG. 4 is a cross-sectional view showing main parts of the steering apparatus in accordance with one embodiment of the present disclosure, FIG. 5 is a plan view showing main parts of the steering apparatus in accordance with one embodiment of the present disclosure, FIG. 6 is a cross-sectional view taken along line A-A' in FIG. 5, FIG. 7 is a cross-sectional view taken along line B-B' in FIG. 5, FIG. 8 is an exploded perspective view showing a state in which a rotation preventer and a damper are coupled to the rod provided in the steering apparatus in accordance with one embodiment of the present disclosure, FIG. 9 is an assembled perspective view of FIG. 8, FIG. 10 is a perspective view showing a magnet holder provided in the steering apparatus in accordance with one embodiment of the present disclosure, FIG. 11 is a view showing a process of coupling a rotation preventer and a magnet holder provided in the steering apparatus in accordance with one embodiment of the present disclosure, and FIG. 12 is an exploded perspective view showing a coupled state of a sensing unit and a magnet holder provided in the steering apparatus in accordance with one embodiment of the present disclosure.

Referring to FIGS. 1 to 12, a steering apparatus 1 in accordance with the present embodiment may include a housing 100 in which a rod 200 is accommodated and a sensor coupler 110 is provided, a rotation preventer 300 coupled to the rod 200 to limit rotation of the rod 200, a damper 400 disposed between the sensor coupler 110 and the rotation preventer 300, a magnet holder 500 coupled to the rotation preventer 300, and a sensing unit 600 that senses a position of a magnet 530 provided in the magnet holder 500.

The steering apparatus 1 may be provided as a steer-by-wire type steering apparatus to steer the front or rear wheels. Accordingly, the steering apparatus 1 may further include a driver 10 that generates a driving force when a rotation signal of the steering wheel is input, and a power transmission device 20 that transmits the driving force of the driver 10 to the rod 200.

The driver 10 may be provided as a motor that receives electric power from a main battery (not shown) and generates a driving force through information such as a steering angle according to rotation of the steering wheel.

The power transmission device 20 may be provided to receive a driving force, that is, a rotational force, from the driver 10 and transmit the force to the rod 200. For example, the power transmission device 20 may include a motor pulley 21 coupled to a rotating shaft 11 of the motor 10, a ball nut 22 screw-coupled with the rod 200, and a nut pulley 23 provided on the ball nut 22, a belt 25 that connects the motor pulley 21 and the nut pulley 23, and the like.

When the driving force of the driver 10 is transmitted to the nut pulley 23 through the belt 25, the ball nut 22 is rotated, and the rotation of the ball nut 22 causes the rod 200 to be moved in an axial direction. In this process, the rotational motion of the driver 10 is converted into translational motion. That is, the rotation preventer 300 is provided so that the rod 200 is moved in the axial direction, rather than being rotated, when the driving force is transmitted by the driver 10, which makes it possible to effectively transmit the driving force.

The rod 200 provided for the movement in the axial direction is accommodated in the housing 100 for steering of the wheels. In this case, both ends of the rod 200 are connected to the front or rear wheels, and as the rod 200 slides in the axial direction, the front or rear wheels are steered.

As described above, in order to determine whether or not the rod 200 has been moved to a target position set by a driver's steering hand operation during the sliding movement, the magnet holder 500 and the sensing unit 600 may be installed at a position where the rotation preventer 300 is coupled.

The magnet holder 500 and the sensing unit 600 are provided as one sensor assembly and are coupled to the rotation preventer 300 fixed to the rod 200 to ensure ease of assembly. Structures of the sensing unit 600 and the magnet holder 500 will be described again below.

The housing 100 is provided with a sensor coupler 110 passing through inner and outer surfaces so that a part of the rod 200 is exposed. More specifically, the sensor coupler 110 is formed to protrude outward from the housing 100 and is provided with an elongated hole 120 formed to be long in the axial direction. Accordingly, the rotation preventer 300 may be inserted into the elongated hole 120 and coupled with the rod 200. The sensor coupler 110 may be closed so that the elongated hole 120 is not exposed from the outside as the sensing unit 600 to be described below is assembled.

The elongated hole 120 may be provided as a first elongated hole 121 into which the rotation preventer 300 is inserted, and a second elongated hole 122 formed stepwise from the first elongated hole 121 so as to be formed outside the first elongated hole 121.

The first elongated hole 121 may be formed to have a longer length than the length of the rotation preventer 300 in the axial direction. Accordingly, the rotation preventer 300 coupled with the rod 200 may be moved in a certain range in the axial direction of the first elongated hole 121. In this case, the rotation preventer 300 may be coupled to be supported in a width direction of the housing 100 at a position where the first elongated hole 121 is formed. Therefore, the rotation of the rod 200 is limited by the rotation preventer 300 and the rod 200 is moved in the axial direction.

The second elongated hole 122 is located above the first elongated hole 121 in a vertical direction. The magnet holder

500 coupled to the rotation preventer 300 and a part of the sensing unit 600 for guiding the magnet holder 500 may be inserted into the second elongated hole 122.

The rotation preventer 300 may include a support member 310 having at least one coupling hole 312 formed to be coupled to the rod 200 and a fixing bolt 320 inserted into the coupling hole 312 to be coupled to the rod 200.

As shown, the support member 310 includes a body portion 311 having a predetermined length and a coupling portion 313 where the center of the body portion 311 protrudes to one side. In this case, the coupling holes 312 may be formed on both sides of the body portion 311 with respect to the coupling portion 313 in a longitudinal direction.

The rod 200 may be provided with a chamfered portion 210 in which the support member 310 is supported. The chamfered portion 210 may have a shape corresponding to the support member 310 and may be provided flat so as to be in surface contact with the support member 310. Fixing holes 212 are formed in the chamfered portion 210 at positions corresponding to the coupling holes 312 formed in the support member 310. Therefore, the fixing bolts 320 are inserted into the coupling holes 312 in a state in which the support member 310 is seated on the chamfered portion 210, and as the fixing bolts 320 are screw-coupled with the fixing holes 212, the support member 310 is fixed to the rod 200.

In the state in which the support member 310 is fixed to the rod 200, the body portion 311 is provided to be supported in the width direction of the housing 100 by being positioned at a portion where the first elongated hole 121 is formed. In addition, a fastening groove 314 coupled to the magnet holder 500 to be described below may be formed in the coupling portion 313. Accordingly, the rotation preventer 300 may be coupled to the magnet holder 500 through the fastening groove 314 while being fixed to the rod 200.

The rotation preventer 300 is movable in the axial direction of the first elongated hole 121, and both sides thereof in the width direction are supported by the housing 100, and thus rotation of the rod 200 coupled with the support member 310 is prevented.

Meanwhile, a bush 330 may be provided in the coupling hole 312 so that the fixing bolt 320 is inserted. The bush 330 is disposed between an outer circumferential surface of the fixing bolt 320 and an inner circumferential surface of the coupling hole 312 so that a load is transmitted to the fixing bolt 320 when rotational torque is generated in the rod 200.

For example, when the fixing bolt 320 is fastened to the support member 310 in a state in which the bush 330 is not provided, deformation may occur in a portion to which the fixing bolt 320 is fastened due to a bolt fastening force of the fixing bolt 320, and deformation may also occur since the support member 310 receives all the force (load) when the rotational torque of the rod 200 is generated. As a consequence, it is likely that a gap with the housing 100 may easily occur.

However, in accordance with the present embodiment, when the bush 330 is provided in the coupling hole 312, the bush 330 receives the fastening force of the fixing bolt 320, and the rotational torque of the rod 200 is also transmitted to the fixing bolt 320 fastened to the bush 330, and thus an effect of improving the breaking strength of the rotation preventer 300 may be obtained.

The rotation preventer 300 may be made of a steel material having rigidity to resist the rotational torque of the rod 200.

Meanwhile, a gap may occur between the support member 310 and the housing 100 due to assembly tolerance, wear of the support member 310, and the like, and if compensation for the gap is not made, the support member 310 collides with the housing 100 due to a road impact or the like and noise is generated, which may degrade the steering feeling of the driver.

Further, as will be described below, the magnet holder 500 and the rotation preventer 300 are coupled to each other to slide together and a sensor senses the position of the magnet 530 provided in the magnet holder 500 to determine the position of the rod 200, and if there is a gap between the support member 310 and the housing 100, the movement in the width direction generated in the support member 310 is transmitted to the magnet 530, which may result in the lowering of the accuracy of the sensor.

Therefore, in order to compensate for the gap between the support member 310 and the housing 100 to solve the aforementioned limitations, the damper 400 may be installed on the support member 310.

The damper 400 may be provided to be disposed between the inner side of the sensor coupler 110 and the rotation preventer 300. As shown, the damper 400 may be coupled to the body portion 311 of the support member 310. The damper 400 may be made of an elastic material capable of generating an elastic force. For example, the damper 400 may be made of a rubber material.

The damper 400 may be coupled to the outer surface of the support member 310, and provided between the support member 310 and the sensor coupler 110 in a compressed state. Accordingly, the damper 400 may perform a function of absorbing the gap due to the assembly tolerance and absorbing deformation due to bending of the rod 200 by applying the elastic force in the width direction of the housing 100. In addition, the damper 400 may reduce noise by absorbing vibrations generated by an impact between the rotation preventer 300 and the housing 100, and may prevent the deterioration of accuracy of the sensor by compensating for the gap when the gap occurs between the support member 310 and the housing 100.

A grease pocket 410 for storing a fluid may be provided in the damper 400 described above. The grease pocket 410 is preferably formed on the outer surface of the damper 400 so as to lubricate a portion between the sensor coupler 110 and the damper 400. The grease pocket 410 may be formed only in a portion supported in the width direction of the housing 100. A plurality of grease pockets 410 may be formed at regular intervals on the outer surface of the damper 400. As shown, the grease pockets 410 are formed in a vertical direction and in a certain pattern along the outer surface of the damper 400, but are not limited thereto, and may have any shape as long as they store a fluid and allow a portion between the damper 400 and the housing 100 to be lubricated.

The magnet holder 500 is provided to be coupled to the rotation preventer 300 fixed to the rod 200 and moved together with the rod 200 when the rod 200 slides. The magnet holder 500 may include a main body 510, a magnet 530 fixed to the main body 510, and a fastener 520 protruding from one side of the main body 510 and coupled to the rotation preventer 300.

The magnet 530 may be separately installed on the main body 510 or may be integrally provided with the main body 510 by being subjected to insert injection molding together with the main body 510.

The fastener 520 may be formed at a position corresponding to the fastening groove 314 formed in the coupling portion 313 of the rotation preventer 300. That is, the fastener 520 may protrude from the magnet holder 500 toward the rotation preventer 300.

The fastener 520 may be provided to have a spherical shape having an outer surface formed as a curved surface and may be inserted into the fastening groove 314. In addition, one side of the magnet holder 500 and the other side of the rotation preventer 300 are spaced apart by a predetermined distance, and in a state in which the fastener 520 is inserted into the fastening groove 314, the magnet holder 500 and the rotation preventer 300 may rotate relative to each other. That is, bending may occur in the rod 200 due to road impacts or the like, and in order to prevent deterioration of accuracy of the sensor caused by the movement of the magnet holder 500 due to the bending of the rod 200, the magnet holder 500 and the rotation preventer 300 rotate relative to each other to cancel the bending of the rod 200.

In addition, a cut groove 522 may be provided at the center of the fastener 520 in a direction orthogonal to the axial direction of the rod 200. The cut groove 522 may be formed to the bottom of the fastener 520.

The fastener 520 having the cut groove 522 in the center includes a pair of fastening bodies 524 having a substantially hemispherical shape on both sides of the cut groove 522. The pair of fastening bodies 524 may be elastically bent toward the cut groove 522 when an external force is applied.

An outer diameter of the fastener 520 may be provided to have a larger diameter than a diameter of the fastening groove 314. Accordingly, when the fastener 520 is assembled into the fastening groove 314, the fastener 520 may be press-fitted into the fastening groove 314 while being deformed by movement toward the cut groove 522. Therefore, as the pair of fastening bodies 524 exert a restoring force in a direction away from each other in a state in which the fastener 520 is press-fitted into the fastening groove 314, the fastener 520 may maintain a stable coupling state in the fastening groove 314.

In this way, the fastener 630 may be rotated in a state of being elastically in close contact with the fastening groove 314 and may be moved in a direction orthogonal to the axial direction of the rod 200, and thus even when the rod 200 is bent or a road impact is applied, it is possible to maintain the coupled state and possible to prevent deterioration of sensing accuracy between the magnet holder 500 and the sensing unit 600.

The magnet holder 500 may further include support portions 511 and 512 protruding from both sides in the width direction for coupling with the sensing unit 600. The support portions 511 and 512 may be formed to be spaced apart in the vertical direction to be supported and guided by guides 620 of the sensing unit 600 to be described below. For example, the support portions 511 and 512 may be provided as a first support portion 511 and a second support portion 512.

The sensing unit 600 may include a sensor housing 610 in which a sensor for sensing the position of the magnet 530 is provided, and a pair of guides 620 provided on one side of the sensor housing 610 to guide the magnet holder 500.

The sensor housing 610 is coupled to the outer side of the sensor coupler 110 to close the sensor coupler 110.

The pair of guides 620 may be spaced apart in the width direction and formed in the axial direction on the lower side of the sensor housing 610 to be inserted into the sensor coupler 110. The pair of guides 620 may be positioned in the second elongated hole 122 and coupled with the magnet holder 500.

The pair of guides 620 may be provided to protrude so that a guide hole 622 is formed in the longitudinal direction under the sensor housing 610. Accordingly, the first support portions 511 formed on both sides of the magnet holder 500 in the width direction may be inserted into the guide holes 622 and coupled thereto. In addition, the second support portion 512 may be supported by the guide 620 on the opposite side of the guide hole 622. Therefore, when the magnet holder 500 is moved, the first support portion 511 and the second support portion 512 are guided with the pair of guides 620 interposed therebetween and may be stably moved. That is, the guide 620 is provided between the first support portion 511 and the second support portion 512, and the magnet holder 500 is guided along the guide 620 and is slid only in the axial direction. The first support portion 511 and the second support portion 512 are formed to extend in the axial direction or a plurality of first support portions 511 and second support portions 512 are arranged while being spaced apart in the axial direction, and thus the occurrence of movement of the magnet holder 500 may be prevented.

Meanwhile, the first support portion 511 may be provided to have a wedge shape with one side having an inclined surface, which makes it possible for the first support portion 511 to be easily inserted into the guide hole 622 and stably supported by the guides 620 after being inserted into the guide hole 622.

The second support portion 512 may be formed to extend in the axial direction. Accordingly, an area where the second support portion 512 is supported by the guides 620 is widened, and thus it is possible to effectively prevent the movement of the magnet holder 500.

As described above, with the structure of the steering apparatus in accordance with the present embodiment, by compensating for the gap due to the wear occurring in the rotation preventer 300 by the rotational torque generated by the rod 200 being slid, it is possible to reduce noise and precisely sense the position of the rod 200 and to prevent deterioration of accuracy of the sensor due to movement or bending of the rod 200.

As is apparent from the above description, a steering apparatus in accordance with the present embodiments has an effect of preventing the rotation of a rod through a rotation preventer and minimizing noise and vibrations due to the impact with a housing.

In addition, the steering apparatus in accordance with the present embodiments may prevent deterioration of accuracy of a sensor for sensing the position of a rod by compensating for a gap for stable support even when wear with the housing occurs.

As described above, the present disclosure has been hereinabove described with regard to a limited number of embodiments and drawings, but the present disclosure is not limited thereto and it is obvious to those skilled in the art that various modifications and changes may be made thereto within the technical aspects of the present disclosure and the equivalent scope of the appended claims.

What is claimed is:

1. A steering apparatus comprising:
    a housing in which a rod slidably provided in an axial direction for wheel steering is accommodated and a sensor coupler passing through an inner surface and an outer surface to expose a part of the rod is provided;
    a rotation preventer coupled to the rod through the sensor coupler to be moved together with the rod and supported in a width direction of the housing to limit rotation of the rod;
    a damper coupled to the rotation preventer to be disposed between the sensor coupler and the rotation preventer;

a magnet holder coupled to the rotation preventer to be moved together with the rod and provided with a magnet; and
    a sensing unit coupled to the sensor coupler and including a sensor configured to sense a position of the magnet,
    wherein the rotation preventer includes a support member to be coupled to the rod,
    wherein the damper is coupled to an outer surface of the support member, and provided between the support member and the sensor coupler in a compressed state,
    wherein the support member comprises:
        a coupling portion with a center that protrudes upward;
        coupling holes formed on both sides of the coupling portion in the axial direction to be coupled to the rod; and
        a fastening groove that is formed in the coupling portion and that is coupled with the magnet holder, and
    wherein the rotation preventer further includes fixing bolts that are inserted into the coupling holes to couple the coupling portion to the rod.

2. The steering apparatus according to claim 1, wherein the rod is provided with a chamfered portion so that the support member is seated in surface contact.

3. The steering apparatus according to claim 1, wherein a bush is provided in each of the coupling holes.

4. The steering apparatus according to claim 1, wherein the damper includes a grease pocket for storing a fluid to lubricate a portion between the sensor coupler and the damper.

5. The steering apparatus according to claim 4, wherein a plurality of grease pockets are formed at regular intervals on an outer surface of the damper.

6. The steering apparatus according to claim 1, wherein:
    the sensor coupler includes an elongated hole formed to be long in the axial direction; and
    the elongated hole is provided as a first elongated hole into which the rotation preventer is inserted, and a second elongated hole that is formed stepwise from the first elongated hole on an outer circumferential side of the first elongated hole and into which the sensing unit is partially inserted and coupled.

7. The steering apparatus according to claim 1, wherein:
    the magnet holder includes a main body, a magnet fixed to the main body, and a fastener protruding from a lower portion of the main body and coupled to the rotation preventer; and
    a fastening groove into which the fastener is inserted is formed in the rotation preventer.

8. The steering apparatus according to claim 7, wherein the fastener has a spherical shape having a diameter larger than a diameter of the fastening groove, is provided with a cut groove in a vertical direction at a center of the fastener, is deformed by the cut groove, and is press-fitted into the fastening groove.

9. The steering apparatus according to claim 1, wherein:
    the sensing unit includes a sensor housing coupled to close the sensor coupler, and a pair of guides spaced apart in the width direction and formed in the axial direction on a lower side of the sensor housing inserted into the sensor coupler; and
    the magnet holder is supported and moved between the pair of guides.

10. A steering apparatus comprising:
    a housing in which a rod slidably provided in an axial direction for wheel steering is accommodated and a sensor coupler passing through an inner surface and an outer surface to expose a part of the rod is provided;

a rotation preventer coupled to the rod through the sensor coupler to be moved together with the rod and supported in a width direction of the housing to limit rotation of the rod;

a damper coupled to the rotation preventer to be disposed between the sensor coupler and the rotation preventer;

a magnet holder movably coupled to the rotation preventer to be moved together with the rod and provided with a magnet; and a sensing unit coupled to the sensor coupler and including a sensor configured to sense a position of the magnet, wherein:

the magnet holder includes a main body, a magnet fixed to the main body, and a spherical fastener inserted into a fastening groove provided in the rotation preventer;

the fastener is rotatable by a predetermined angle with respect to a center of the fastener within the fastening groove, and is movable in a direction orthogonal to the axial direction of the rod within the fastening groove; and the magnet is integrally provided with the main body by insert injection molding.

11. The steering apparatus according to claim 10, wherein:

the sensing unit includes a sensor housing coupled to close the sensor coupler, and a pair of guides spaced apart in the width direction and formed in the axial direction on a lower side of the sensor housing inserted into the sensor coupler; and the magnet holder includes support portions that are each supported between the pair of guides on both sides in a width direction and is moved between the pair of guides.

12. The steering apparatus according to claim 11, wherein:

the guide includes a guide hole formed in a longitudinal direction; and the support portion includes a first support portion supported by being inserted into the guide hole, and a second support portion supported by the guide.

13. The steering apparatus according to claim 12, wherein at least one of the first support portion and the second support portion is divided in the longitudinal direction to be provided in a plurality.

14. The steering apparatus according to claim 12, wherein the first support portion is provided in a wedge shape with one side having an inclined surface.

* * * * *